May 26, 1953 — T. STIEBEL — 2,640,140
PORTABLE HOT BEVERAGE PREPARATION APPARATUS
Filed Dec. 6, 1950 — 2 Sheets-Sheet 1
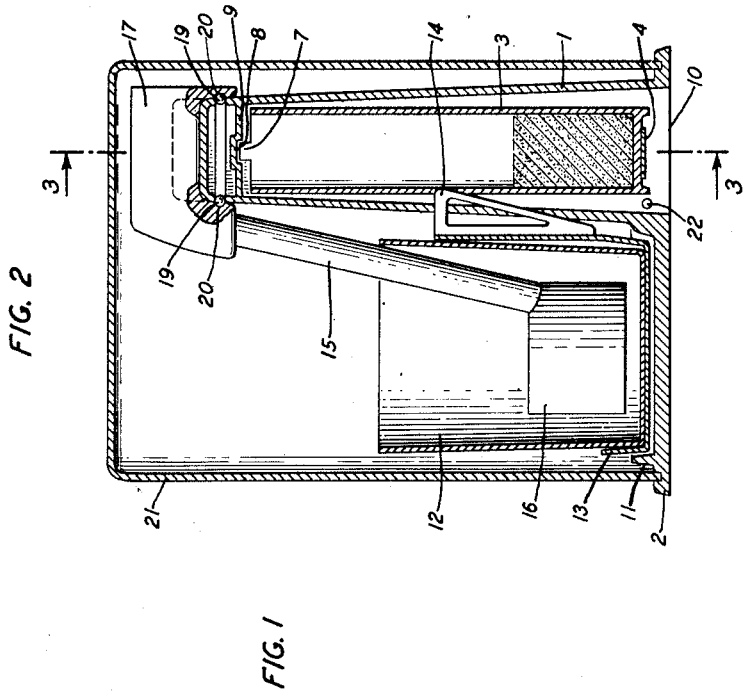
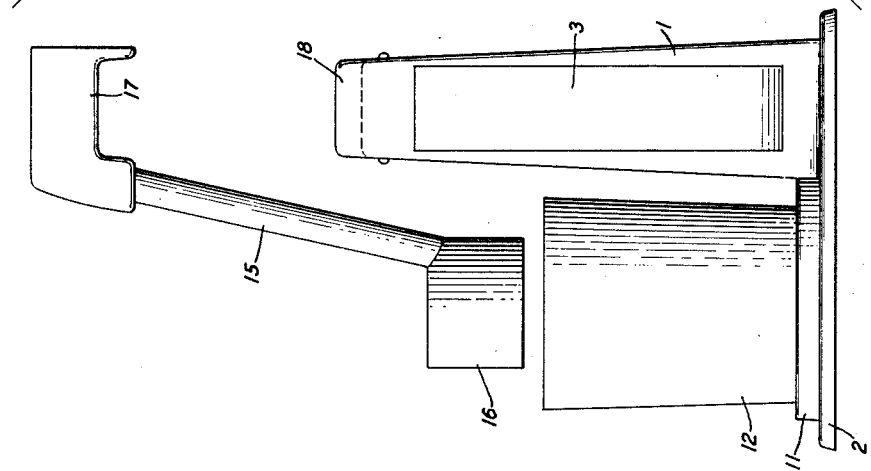
INVENTOR
THEODOR STIEBEL
BY
ATTORNEY

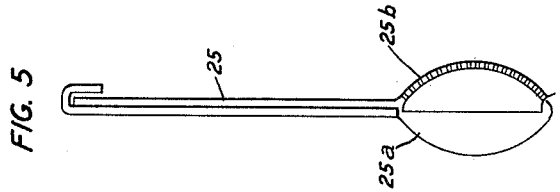
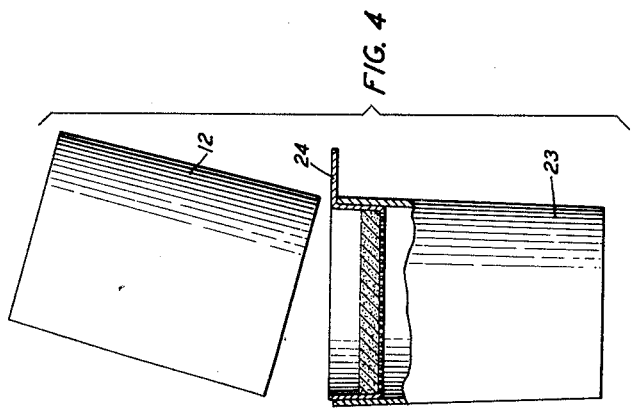
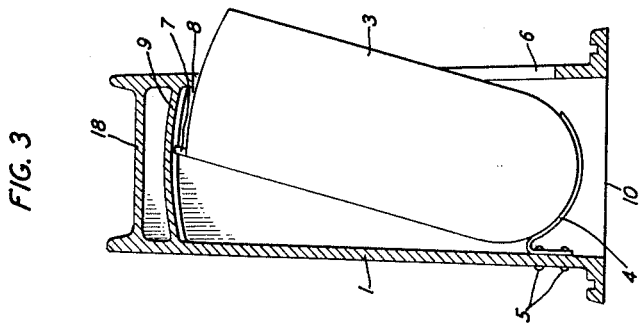

Patented May 26, 1953

2,640,140

UNITED STATES PATENT OFFICE 2,640,140

PORTABLE HOT BEVERAGE PREPARATION APPARATUS

Theodor Stiebel, Holzminden, Germany

Application December 6, 1950, Serial No. 199,391

1 Claim. (Cl. 219—43)

This invention relates to portable apparatus for preparing hot beverages in rather small quantities.

An object of the invention is to provide a small compact apparatus by which beverages requiring heat may be prepared.

A further object is to provide all the apparatus which is required for the preparation, and consumption, of hot beverages in a single compact assembly including storage means for the concentrate or solids from which the beverage is made.

Still a further object of the invention is to provide for the accurate positioning of the heater element with respect to the vessel in which the heater element is used to prepare the hot water for the beverage without risking breakage of the vessel due to excessive heating thereof on direct contact with the heater element.

I accomplish the foregoing, and other, objects by providing a base with an integral stand or upright thereon adapted to hold an immersion heater in one predetermined position only, the base being provided with a guide which accurately positions the vessel into which the immersion heater extends in the predetermined position, so that the heater portion of the immersion heater is sufficiently spaced from all surfaces of the vessel to prevent damage thereto by excessive heat. The guide for the vessel and the vessel may have interposed therebetween a removable handled holder by which the vessel may readily be removed from the base, as when it is to be filled with water or when drinking the hot beverage. I form the integral upright for the immersion heater with a compartment which may be tilted from within the upright and in which the necessary materials, such as coffee, tea, and sugar, may be stored for convenient use.

One specific embodiment of my invention is disclosed in the annexed drawings, in which:

Figure 1 is a schematic elevational view of the essential parts of my portable hot beverage preparation apparatus with the cover removed;

Figure 2 is a vertical section through my beverage preparation apparatus;

Figure 3 is a vertical section along line 3—3 of Figure 2 through the upright stand;

Figure 4 shows one procedure for preparing coffee using an additional beverage container; and Figure 5 shows a tea-egg for use with my apparatus.

The stand or upright 1 is integral with the base 2 and is hollow, housing the container 3 in which may be stored the material to be prepared, such as coffee or tea, and which may have a separate open top compartment also for sugar. The container 3 is supported on the curved spring 4 which is attached by rivets 5 to one wall of the upright 1, and which holds the container, when not in use, within the upright. To enable the removal of the contents from the container 3, one wall of the upright has the opening 6, permitting tilting of the container so that its open top is accessible. The container is guided by means of a projection 7 at its upper end in the groove 8 of an intermediate wall 9 within the upright 1, which intermediate wall serves as a closing cover for the container 3 while in the housing of the upright. The lower region 10 of the upright is open in the base 2.

If it be considered that some materials, such as certain plastics and certain glasses, are sensitive to temperatures in excess of the boiling point of water, the need for keeping the heater element, for example of an immersion heater, out of contact from such plastics or glasses is obvious. The simplest solution would be to insert or hold the heater in some kind of spacer supported from the top of a vessel of such material. In my portable hot beverage apparatus, I make certain that the immersion heater I employ therein is spaced, on proper use, from the beverage containing vessel by fixing both the position of the heater and of the vessel. I have found that it is not sufficient merely to support the immersion heater by removably affixing it to the top of the beverage container, as by a spring clip, because the heater so supported has a tendency to rock about the clip as a pivot and thus does not eliminate the possibility of the heater striking against a lower wall region of the container. This is so even when a second clip, spaced about 180 degrees from the first clip is employed.

The base has a rim guide 11 for accurately positioning the beverage vessel 12 on the base. The beverage vessel is preferably provided with a formed saucer 13 having an integral handle 14. The immersion heater 15 has a heating ring 16 and a formed handle 17 adapted to be supported on, and locked into position to, the upper end of upright 1 which, for this purpose, is formed in the nature of a saddle 18, see Figure 3. The handle 17 has depressions 19 into which spring pressed pins or balls 20 in the upright engage on proper positioning of the handle on the saddle. With the handle so positioned and held on the upright, the immersion heater is in proper position with its heating ring 16 within, and adjacent the bottom of, the beverage vessel 12 touching neither the bottom nor the walls thereof. With the vessel so positioned in the rim guide and the immersion heater supported on, and latched to, the upright the relative position of these elements is thus fixed, and on energization of the heater through an electric cord, not shown, all danger of heat injury to the vessel is eliminated. A formed hood cover 21 fits over the base and the upright, as well as the vessel and immersion heater (with the cord now disconnected) when so positioned, thus forming a unitary compact package for transport. The cover may be latched to the base by one or more spring pressed pins 22. It will be noted I fit the cover in a groove running the periphery of the base, which groove acts as a catch basin for any overflow when preparing the beverage. Incidentally, the removed hood cover is a conveniently large enough vessel for use when drawing water rather than the relatively small beverage container. Within the package so formed, a second beverage vessel 23, a sieve 24, and a tea egg 25 of two spoon shaped portions, 25a and 25b, may be provided. The second beverage vessel is of substantially the same shape and volume as the beverage vessel 12 into which it is inserted when not in use. The sieve and the tea egg may conveniently be hung or otherwise supported on the cover or the upright.

To prepare, for example, coffee the container 3 is tipped to the position shown in Figure 3 and a sufficient amount of coffee removed therefrom by means either of spoon portion 25a or spoon portion 25b and placed in vessel 12. Water is added and the vessel restored into the guide rim 11. The immersion heater is then positioned as shown in Figure 2 and plugged in. If the second beverage vessel 23 and the sieve 24 are available, the coffee is placed into sieve 24, rather than into vessel 12 as above, and the water which has been heated in vessel 12 is poured over the coffee in the sieve into the vessel 23. To prepare tea, the tea is put into the tea egg 25 which is immersed into the boiling water in vessel 12.

The base, upright, container, beverage vessels and cover are conveniently made of a plastic material, which may, to enhance the appearance of the apparatus, be translucent. But I do not limit myself to such material for these elements; metal may also be used.

What I claim is:

Portable hot beverage preparation apparatus comprising a base, an upright integral with the base, a beverage container, a rim edge integral with the base and adapted to receive the bottom region of the beverage container, an electric immersion heater comprising a heater, a shaft and a formed handle, the heater extending from the lower end of the shaft in substantially the opposite direction relative to that in which the formed handle extends from the upper end of the shaft, a saddle on the upper end of the upright, the formed handle having a surface adapted to fit snugly on the surface of the saddle, a plurality of spring pressed members extending outwardly from the upright in the saddle region thereof, a plurality of depressions adapted to be engaged by the spring pressed members and positioned in the fitting surface of the formed handle, the members engaging the depressions when the fitting handle surface is snugly on the saddle with the heater in its predetermined position within the beverage container, at least one of each of the spring pressed members and depressions being at substantially the remotest region of the saddle respective to the fitting handle surface in the direction in which the handle extends from the shaft.

THEODOR STIEBEL.

References Cited in the file of this patent

UNITED STATES PATENTS

| Number | Name | Date |
|---|---|---|
| 1,117,277 | Supplee | Nov. 17, 1914 |
| 1,425,837 | Clark | Aug. 15, 1922 |
| 1,588,776 | Shoenberg et al. | June 15, 1926 |
| 1,680,743 | Leevers | Aug. 14, 1928 |
| 1,923,508 | Ross | Aug. 22, 1933 |
| 2,240,953 | Kaye | May 6, 1941 |

FOREIGN PATENTS

| Number | Country | Date |
|---|---|---|
| 572,737 | Germany | Mar. 21, 1933 |
| 679,520 | France | Apr. 14, 1930 |